United States Patent
Vlassof et al.

(10) Patent No.: US 12,181,071 B2
(45) Date of Patent: Dec. 31, 2024

(54) CONSTRUCTING A VALVE BELLOWS FOR A VALVE

(71) Applicant: Dresser, LLC, Houston, TX (US)

(72) Inventors: Cyril Nicolas Vlassof, Saint-Georges des Groseillers (FR); George Dodan, Saint Johns, FL (US); Donald Stroman Sanders, Atlanta, GA (US); Mikhail Anisimov, Houston, TX (US); Chad Eric Yates, Houston, TX (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 18/085,639

(22) Filed: Dec. 21, 2022

(65) Prior Publication Data
US 2024/0209958 A1    Jun. 27, 2024

(51) Int. Cl.
*F16K 41/10*    (2006.01)
*B33Y 80/00*    (2015.01)
*F16K 27/12*    (2006.01)

(52) U.S. Cl.
CPC .............. *F16K 41/10* (2013.01); *B33Y 80/00* (2014.12); *F16K 27/12* (2013.01)

(58) Field of Classification Search
CPC ... F16J 3/04–048; F16K 41/10; F16K 41/106; F16K 2200/30; F16K 2200/305; B33Y 80/00
USPC ................ 251/335.3; 74/18, 18.2; 92/35, 39
See application file for complete search history.

(56) References Cited

U.S. PATENT DOCUMENTS

| | | | | |
|---|---|---|---|---|
| 1,844,553 A | * | 2/1932 | Barlow | F16K 11/0853 |
| | | | | 251/335.1 |
| 2,495,081 A | * | 1/1950 | Thomas | F16K 1/12 |
| | | | | 137/553 |
| 2,743,738 A | * | 5/1956 | Johnson | F16K 11/044 |
| | | | | 251/75 |
| 2,880,620 A | * | 4/1959 | Bredtschneider | F16K 41/10 |
| | | | | 403/51 |
| 3,528,087 A | * | 9/1970 | Perkins | F16K 11/044 |
| | | | | 137/625.4 |
| 4,359,204 A | * | 11/1982 | Williams | F16K 41/10 |
| | | | | 137/197 |
| 5,000,215 A | * | 3/1991 | Phillips | F16K 41/103 |
| | | | | 264/339 |
| 5,421,547 A | * | 6/1995 | Phillips | F16K 27/0254 |
| | | | | 285/911 |

(Continued)

FOREIGN PATENT DOCUMENTS

| | | |
|---|---|---|
| CN | 208169629 U | 11/2018 |
| JP | 2013050187 A | 3/2013 |

(Continued)

*Primary Examiner* — Kenneth Rinehart
*Assistant Examiner* — Jonathan J Waddy
(74) *Attorney, Agent, or Firm* — Paul Frank + Cullins P.C.

(57) ABSTRACT

A bellows is configured for use on a valve. These configurations may include a corrugated section that is hollow to receive a valve stem therethrough. At its ends, the corrugated section can terminate at adapters. In one implementation, additive manufacturing can construct the bellows as a unitary or monolithic unit, avoiding welds or fasteners that can complicate manufacture of the parts. This techniques can create interfaces between the corrugated section and the adapters that comprises the same material as the adjacent parts.

16 Claims, 6 Drawing Sheets

(56) References Cited

U.S. PATENT DOCUMENTS

| | | | |
|---|---|---|---|
| 7,373,972 B2* | 5/2008 | Ocalan | F16K 31/426 |
| | | | 166/66.7 |
| 9,180,029 B2* | 11/2015 | Hollister | A61L 31/148 |
| 9,624,911 B1* | 4/2017 | Griffith | F24S 23/74 |
| 10,857,777 B2* | 12/2020 | Durant | F16K 31/126 |
| 2006/0207663 A1 | 9/2006 | Tsuge | |
| 2017/0120535 A1* | 5/2017 | MacCurdy | B29C 64/112 |
| 2019/0024794 A1* | 1/2019 | Fages | F16J 15/022 |
| 2021/0190217 A1* | 6/2021 | Bergström | F16J 15/36 |

FOREIGN PATENT DOCUMENTS

| | | |
|---|---|---|
| JP | 2022097991 A | 7/2022 |
| KR | 102092949 B1 | 3/2020 |

* cited by examiner

CONSTRUCTING A VALVE BELLOWS FOR A VALVE

BACKGROUND

Flow controls play a large role in many industrial facilities. Power plants and industrial process facilities, for example, use different types of flow controls to manage flow of a material, typically fluids, throughout vast networks of pipes, tanks, generators, and other equipment. Control valves are useful to accurately regulate flow to meet process parameters. These devices may include parts that prevent leaks of the working fluid to atmosphere. The parts often allow for relative movement, which can complicate their ability to seal with other parts to close any flow pathways that might allow working fluid to escape the device.

SUMMARY

The subject matter of this disclosure relates to improvements in construction of these preventative measures. Of particular interest are embodiments that integrate parts together in a way that both simplifies the assembly and improves functionality to reduce or prevent emissions. These embodiments may create a hermetically-seal enclosure that can contain accidental or "fugitive" emissions. This feature improves safety because it prevents, for the most part, escape gas or vapors that are potentially dangerous to workers in vicinity of control valves and like flow controls. An added benefit is to reduce loss of product, which can allow operators to maintain productivity and increase revenue.

DRAWINGS

This specification refers to the following drawings.

Figure 1:
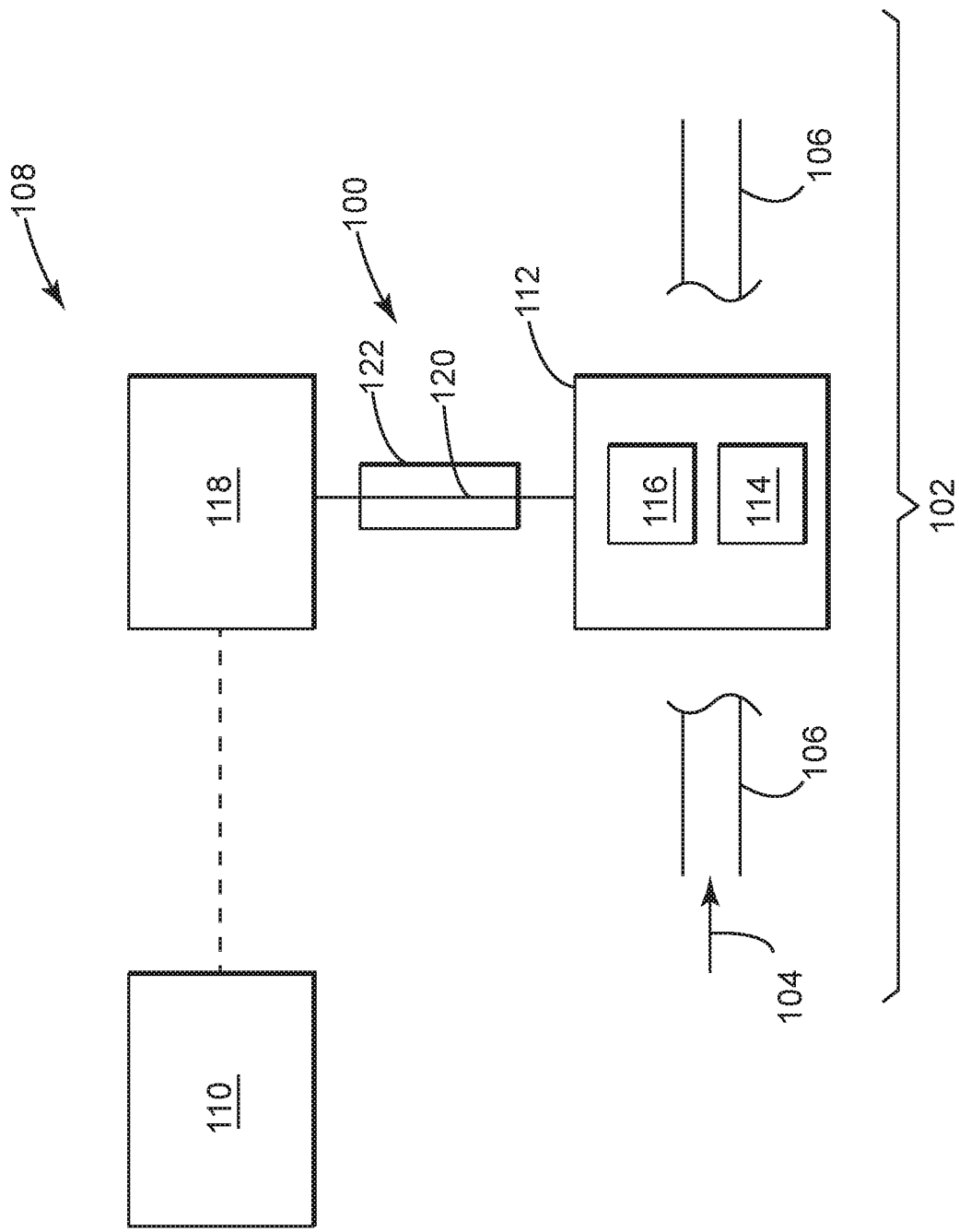
FIG. 1 depicts a schematic diagram of an embodiment of a bellows.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" does not exclude the existence of additional embodiments or implementations that also incorporate the recited features.

DESCRIPTION

The discussion now turns to describe features of the examples shown in the drawings noted above. These examples address problems with bellows seals. These seals prevent fugitive emissions because they can seal around parts that move within the valve. As noted herein, the proposed design assembles into the valve without the need for post-processing welds (or like mechanical fasteners). Other embodiments are within the scope of this disclosure.

FIG. 1 depicts an example of a valve bellows 100. This example is found in a distribution network 102, typically designed to carry material 104 through a network of conduit 106. The network 102 may include a flow control 108 with a valve positioner 110 and a valve body 112 to connect the device in-line with the conduit 106. The valve body 112 may house valve mechanics, shown here to include a seat 114 and a closure member 116. An actuator 118 may couple with the closure member 116 via a valve stem 120. In one implementation, the valve bellows 100 may include a bellows 122 that encloses the valve stem 120.

Broadly, the valve bellows 100 may be configured to prevent leaks. These configurations may include devices that can deflect and expand in respond to load. The devices may adopt construction that is compatible with high temperatures or high pressures, which are conditions that often prevail in oil & gas applications. As noted herein, the proposed design does not require welds or external, separate fasteners to prevent flow of fugitive emissions.

The distribution system 102 may be configured to deliver or move resources. These configurations may embody vast infrastructure. Material 104 may comprise gases, liquids, solids, or mixes, as well. These materials may flow through the system 102 at various pressures and temperatures. The conduit 106 may include pipes or pipelines, often that connect to pumps, compressors, vessels, boilers, and the like. The pipes may also connect to tanks or reservoirs. In many facilities, this equipment forms complex networks.

The flow control 108 may be configured to regulate flow of material 104 through the conduit 106. These configurations may embody control valves and like devices. The valve positioner 110 may be configured to process and generate signals. These configurations may connect to a control network (or "distributed control system" or "DCS"), which maintains operation of all devices on process lines to ensure that materials flow in accordance with a process. The DCS may generate control signals with operating parameters that describe or define operation of the flow control 108 for this purpose. The valve positioner 110 may have operating hardware, like electrical and computing components (e.g., processors, memory, executable instructions, etc.). These components may also include electro-pneumatic devices that operate on an incoming pneumatic supply signal to deliver a control signal, typically compressed air, at pressure that ensures the flow control 108 supplies material 104 downstream according to process parameters.

Parts of the flow control 108 may be configured to regulate flow of material 104 through the conduit 106. The valve body 112 may adopt a structure often made of cast or machined metals. This structure may form a flange at openings I, O. Adjacent pipes 106 may connect to these flanges. The valve mechanics 114, 116 help to regulate flow. The actuator 118 may embody a pneumatic device. The compressed air signal from the valve positioner 110 may energize this device to generate a load. The valve stem 120 may embody an elongate cylinder or rod that directs this load to the valve mechanics 114, 116. This feature helps locate the closure member 116, often a "plug" made of metal or metal alloy, in a desired position relative to the seat 114. This desired position or "set point" may correspond with flow parameters for the material 104 to meet process requirements or parameters. The plug 116 may move relative to the seat 114 to meet or achieve the set point. Movement is generally along an axis of the seat 114, or "up" or "down" for those valves that orient vertically on the process line. As noted, the position of the plug 116 may correspond directly with the flow rate of natural gas (or other resource) that flows through the seat 114 (or from its upstream side to its downstream side).

The bellows 122 may be configured to prevent flow of material 104 out of the flow control 108. These configurations may include devices that can transmit axial motion. These devices may, for example, expand or contract in response to movement of the valve stem 120 (or plug 116). In one implementation, the device may form a continuous, convoluted tube that is hollow. Its construction may comprise materials that are pliable or malleable. Surface "convolutions" or "corrugations" may help to take up any deflection in response to movement of the plug 116. These features may minimize stress in the device that, in turn, extends service life. As noted herein, the construction may integrate other parts that are useful to mount or secure the bellows 122 into the flow control 108 in lieu of welds or fasteners. This feature avoids internal connections that may fail over time. Welds may also complicate assembly, which can increase lead times or labor and material costs.

Figure 2:
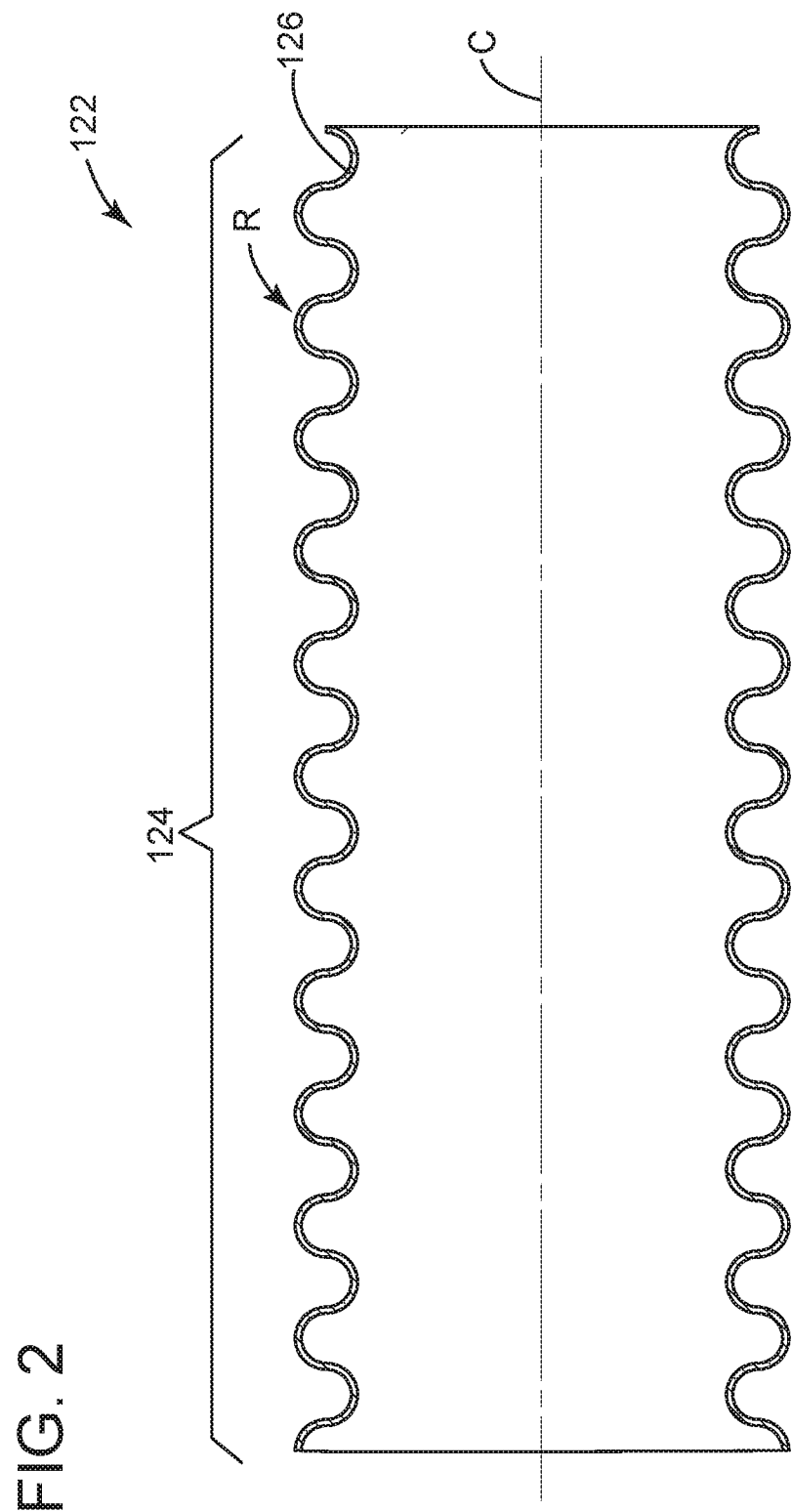
FIG. 2 depicts an elevation view of the cross-section of an example of the bellows of FIG. 1.
Figure 3:
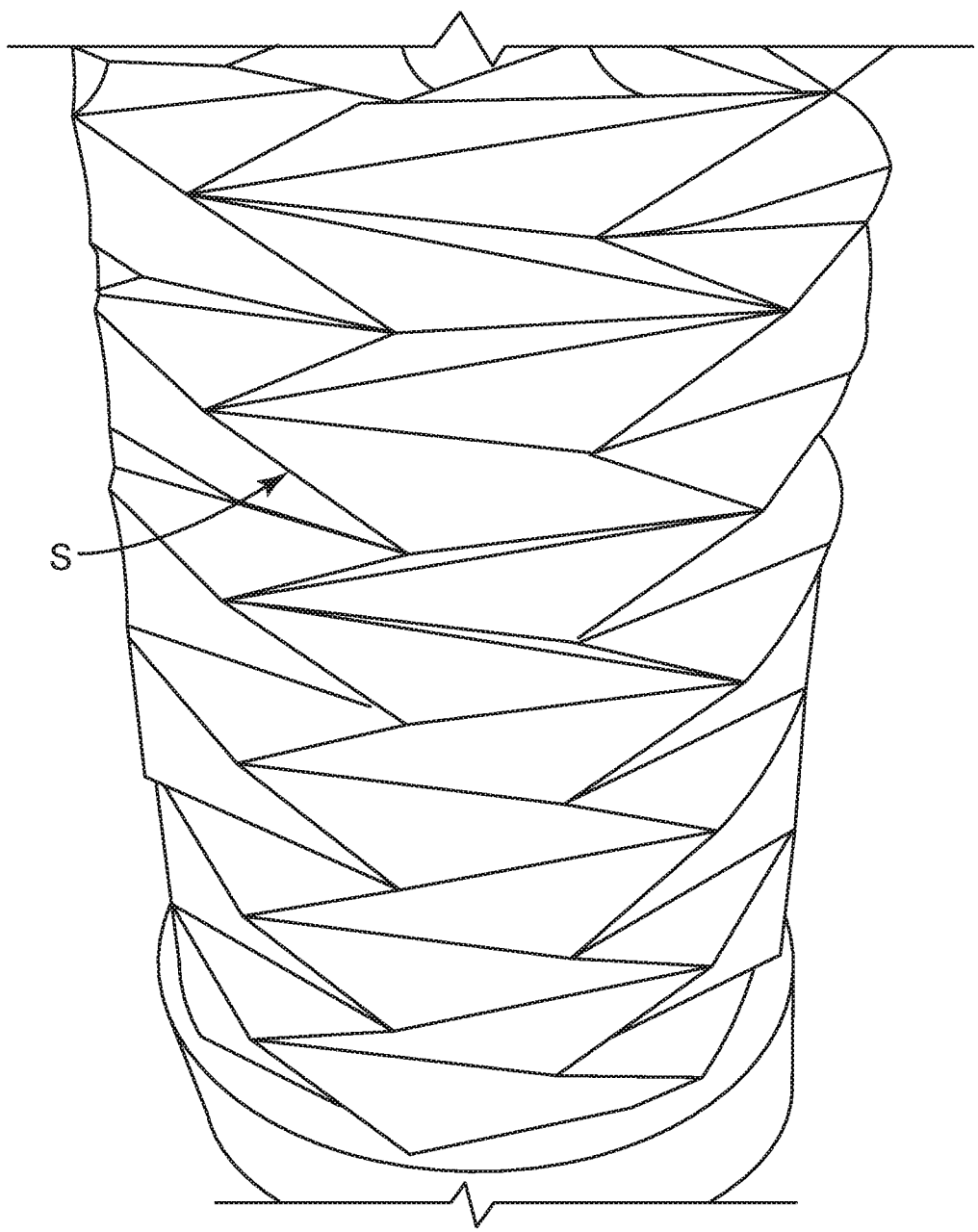
FIG. 3 depicts an elevation view an example of the bellows of FIG. 1.
Figure 4:
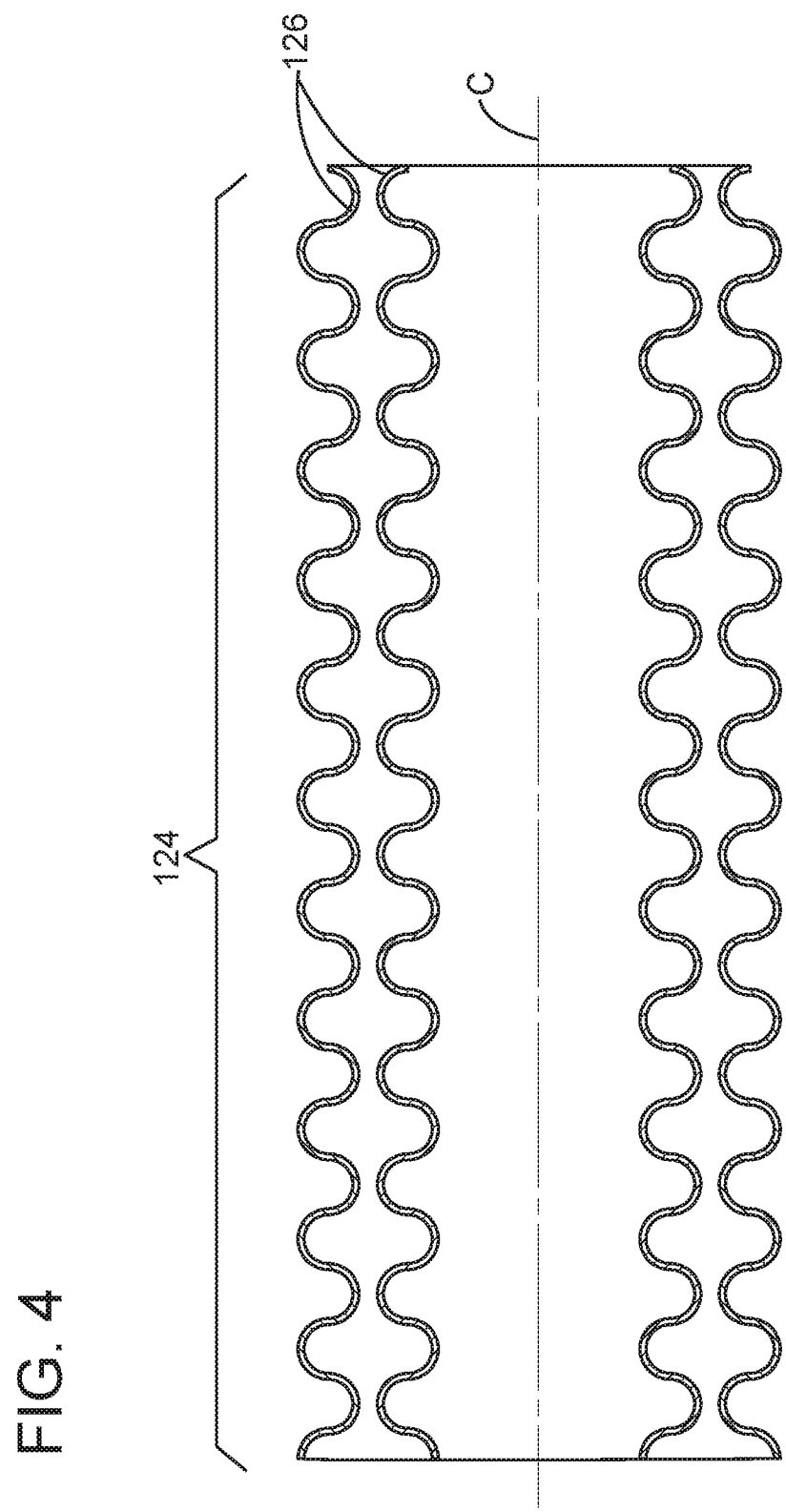
FIG. 4 depicts an elevation view of the cross-section of an example of the bellows of FIG. 1.

FIGS. 2, 3, and 4 depict exemplary structure for the bellows 122. This structure includes a collapsible section 124 that circumscribes the valve stem 120. The collapsible section 124 may comprise a thin wall 126, preferably made of metal or like material. The thin wall 126 may have geometry that allows the structure to deflect or expand under a load, preferably axially along a longitudinal axis C. The geometry may form corrugations R or areas of alternating ridges and grooves. Additive manufacturing techniques (like "3D printing") may find use to expand the breadth of shapes available for this geometry, as well. It may prove useful to provide the thin wall 126 with angles, curves, shapes, bends, or like geometry, for example, that may reduce stress or other inherent conditions that can cause failures in service. Combinations of shapes may prevail as well. As best shown in FIG. 3, the geometry may adopt an angled shape S, although other shapes, like square, rectangular, or diamond may prevail as well. FIG. 4 shows the structure with a pair of thin walls 126 that overlap with each other to form an embedded-wall or "layered" construction. Each of the walls 126 may form a cylinder around the longitudinal axis C. As shown, the first or "outer" cylinder may circumscribe the second or "inner" cylinder. This feature effectively embeds the two pieces together with at least part of the individual pieces overlapping with each other.

Figure 5:
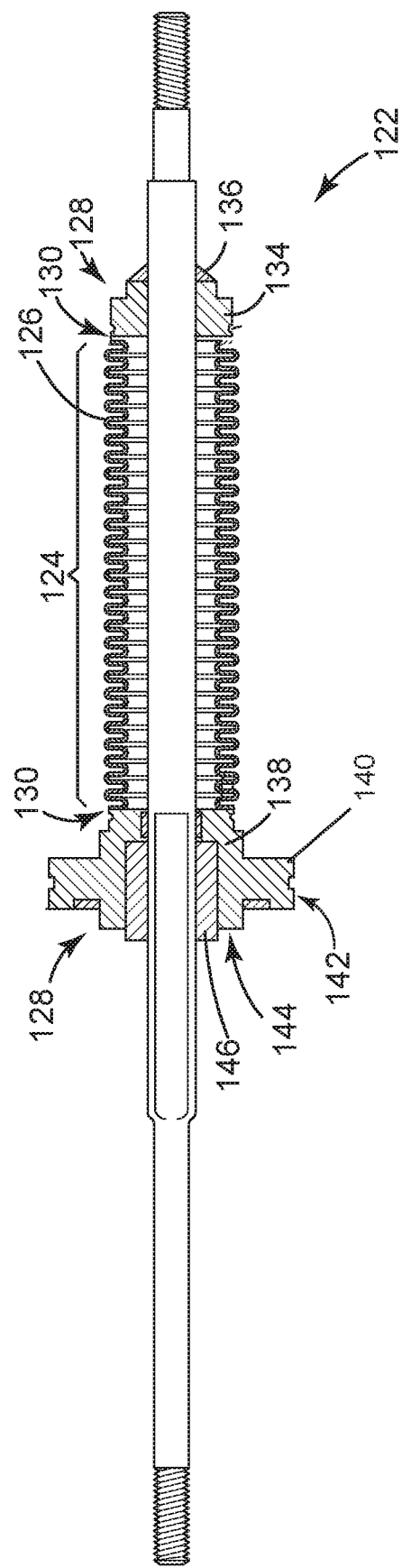
FIG. 5 depicts an elevation view of the cross-section of an example of the bellows of FIG. 1.

FIG. 5 also depicts an elevation view of the cross-section of exemplary structure for the bellows 122. The thin wall 126 may connect with adapters 128 on either end. An interface 130 may couple these two parts together. The interface 130 may be "seamless" or, essentially, configured with the same material as the adjacent parts 126, 128. The homogenous material structure may form the parts 126, 128 as a unitary or "monolithic" unit. This feature is useful because it avoids welds or external, separate fasteners. Additive manufacturing techniques (like "3D printing") may also prove useful for this construction scheme. The "lower" adapter 134 may have a tapered section 136. On the other end, the "upper" adapter 138 may include a shoulder portion 140 with a groove 142 disposed therein. A counter-bore 144 may penetrate one side of the adapter 138 to receive a bushing 146.

Figure 6:
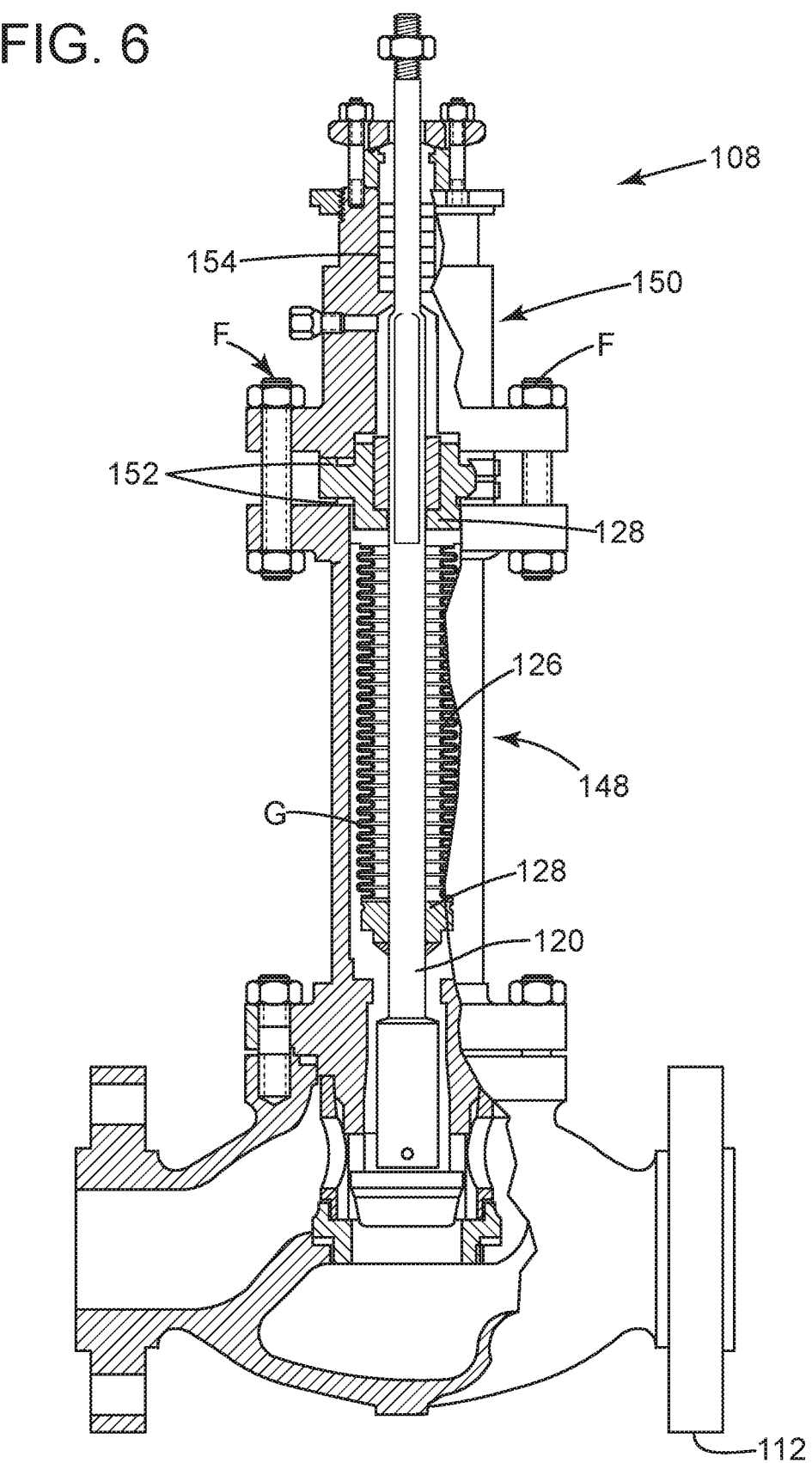
FIG. 6 depicts an elevation view of the cross-section of an example of a flow control.

FIG. 6 depicts an elevation view of the cross-section of exemplary structure for the flow control 108. The unit 126, 128 may reside inside of an extension 148 that couples a bonnet 150 with the valve body 112. Fasteners (F) like nuts or bolts may prevail for this purpose. As shown, the parts 148, 150 may clamp the shoulder portion 140. Gaskets 152 may insert into the groove 138 and reside below the shoulder portion 140 as well. This arrangement seals the gap G between the thin wall 126 and the interior of the extension 148. In one implementation, packing 154 may reside in the bonnet 150. Construction of the packing 154 is useful to allow movement of the valve stem 120, but prevent the flow control 108 from emitting fugitive emissions.

In view of the foregoing, the improvements herein simplify construction of control valves. The embodiments use integral, unitary parts, which foregoes the need for welds (or fastener) to create the bellows seal. This feature can reduce manufacture costs because it avoids the need for certain secondary operations (like welding) or labor. As an added benefit, manufacturers may realize shorter lead times because of the fewer number of manufacturing steps or processes.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A valve, comprising:
   a valve stem;
   a bellows surrounding the valve stem, the bellows formed monolithically by additive manufacturing that results in a homogenous material structure with a pair of adapters on either end, the pair of adapters including a first adapter and a second adapter that receive the valve stem,
   an extension forming a hollow tube that surrounds the bellows; and
   a bonnet disposed on one end of the extension to clamp one of the adapters therebetween,
   wherein the bellows comprises,
   a first wall forming a first cylinder around the valve stem, and
   a second wall, separated on both ends from the first wall, and forming a second cylinder around the first cylinder.

2. The valve of claim 1, wherein the bellows has a thin wall that is corrugated.

3. The valve of claim 1, wherein the bellows has a thin wall with grooves that permit the thin wall to deflect along its longitudinal axis.

4. The valve of claim 1, wherein the bellows has a thin wall with angled shapes that permit the thin wall to deflect along its longitudinal axis.

5. The valve of claim 1, wherein the bellows has a thin wall that has a material composition that is the same as the adapters.

6. The valve of claim 1, wherein the bellows has a pair of thin walls that overlap with each other.

7. The valve of claim 1, wherein the bellows and the adapters connect with one another without welds.

8. The valve of claim 1, wherein the bellows and the adapters connect with one another without welds or external, separate fasteners.

9. A valve, comprising:
   a valve stem;
   a bellows surrounding the valve stem, the bellows comprising a flexible section that terminates at adapters at either end, the flexible section and the adapters formed monolithically by additive manufacturing that results in a homogenous material structure throughout the bellows,
   wherein the flexible section comprises,
   a first wall forming a first cylinder around the valve stem, and
   a second wall, separated on both ends from the first wall, and forming a second cylinder around the first cylinder;
   an extension forming a hollow tube that surrounds the bellows; and
   a bonnet disposed on one end of the extension to clamp one of the adapters therebetween.

10. The valve of claim 9, further comprising:
    a bushing disposed in one of the adapters.

11. The valve of claim 9, wherein an end of the flexible section and one of the adapters forms an interface that is seamless.

12. The valve of claim 9, wherein both ends of the flexible section and the adapters form an interface that is seamless.

13. The valve of claim 9, wherein the flexible section and the adapters have a material composition that is the same.

14. The valve of claim 9, wherein the flexible section and the adapters have a homogenous composition between them.

15. The valve of claim 9, wherein the flexible section and the adapters connect with one another without welds.

16. The valve of claim 9, wherein the flexible section and the adapters connect with one another without welds or external, separate fasteners.

* * * * *